United States Patent
Wei et al.

(10) Patent No.: US 9,755,520 B2
(45) Date of Patent: Sep. 5, 2017

(54) COUPLED-INDUCTOR POWER-SUPPLY CONTROLLER FOR OPERATING A POWER SUPPLY IN A REDUCED-POWER-DISSIPATION MODE

(75) Inventors: Jia Wei, Cary, NC (US); Kun Xing, Cary, NC (US)

(73) Assignee: INTERSIL AMERICAS LLC, Milpitas, CA (US)

(*) Notice: Subject to any disclaimer, the term of this patent is extended or adjusted under 35 U.S.C. 154(b) by 1491 days.

(21) Appl. No.: 12/651,985

(22) Filed: Jan. 4, 2010

(65) Prior Publication Data
US 2010/0102791 A1   Apr. 29, 2010

Related U.S. Application Data

(63) Continuation-in-part of application No. 12/259,220, filed on Oct. 27, 2008, now Pat. No. 7,786,711, which is a continuation of application No. 11/519,516, filed on Sep. 12, 2006, now Pat. No. 7,443,146.

(60) Provisional application No. 60/747,945, filed on May 23, 2006.

(51) Int. Cl.
*H02M 3/158* (2006.01)
*H02M 1/00* (2006.01)

(52) U.S. Cl.
CPC ....... *H02M 3/1584* (2013.01); *H02M 3/1588* (2013.01); *H02M 2001/0064* (2013.01); *Y02B 70/1466* (2013.01)

(58) Field of Classification Search
CPC ............. H02M 3/1584; H02M 3/1588; H02M 2001/0064; H02M 3/156; H02M 2003/1586; H02M 2001/0009; H02M 2001/0032; H02M 3/158; Y02B 70/1466; Y02B 70/16; G05F 1/652; G05F 3/06; H02J 1/102; H03K 17/122
USPC ................. 323/222–225, 271–272, 282–285
See application file for complete search history.

(56) References Cited

U.S. PATENT DOCUMENTS

| | | | |
|---|---|---|---|
| 4,864,478 A | 9/1989 | Bloom | |
| 6,897,641 B1* | 5/2005 | Herbert | ......................... 323/282 |
| 7,138,789 B2 | 11/2006 | Moussaoui et al. | |
| 7,317,305 B1* | 1/2008 | Stratakos | ............... H02M 3/157 323/282 |
| 2005/0156579 A1* | 7/2005 | Moussaoui | ......... H02M 3/1584 323/224 |
| 2009/0045785 A1 | 2/2009 | Xiao et al. | |

OTHER PUBLICATIONS

Intersil Data Sheet ISL6262; May 15, 2006; Two-Phase Core Regulator for IMVP-6 Mobile CPUs, pp. 27.

(Continued)

*Primary Examiner* — Adolf Berhane
*Assistant Examiner* — Henry Lee, III
(74) *Attorney, Agent, or Firm* — Foley & Lardner LLP; Mark J. Danielson

(57) ABSTRACT

An embodiment of a power-supply controller includes first and second circuits. The first circuit is operable to cause a first current to flow through a first phase of a power supply. And the second circuit is operable to cause the second phase of the power supply to operate in a reduced-power-dissipation mode for at least a portion of a time period during which a second current magnetically induced by the first current flows through the second phase.

29 Claims, 6 Drawing Sheets

(56) References Cited

OTHER PUBLICATIONS

Intersil Data Sheet ISL6260, ISL6260B Jan. 3, 2006; Multiphase Core Regulator for IMVP-6 Mobile CPUs, pp. 26.
William Archer, "Current Drives synchronous rectifier", Design Ideas section, EDN (Electronic Design News), p. 279, Nov. 28, 1985.
W.E. Ripel, "Synchronous half wave rectifier" NASA Tech Brief vol. 13 No. 7, item #15, Jul. 1989.
U.S. Patent and Trademark Office, "Notice of Allowance", "from U.S. Appl. No. 11/519,516", Jun. 16, 2008, pp. 1-8, Published in: US.
U.S. Patent and Trademark Office, "Final Office Action", "from U.S. Appl. No. 12/259,220", Nov. 2, 2009, pp. 1-12, Published in: US.
U.S. Patent and Trademark Office, "Notice of Allowance", "from U.S. Appl. No. 12/259,220", Apr. 22, 2010, pp. 1-5, Published in: US.
U.S. Patent and Trademark Office, "Office Action", "from U.S. Appl. No. 12/259,220", Apr. 28, 2009, pp. 1-5, Published in: US.

\* cited by examiner

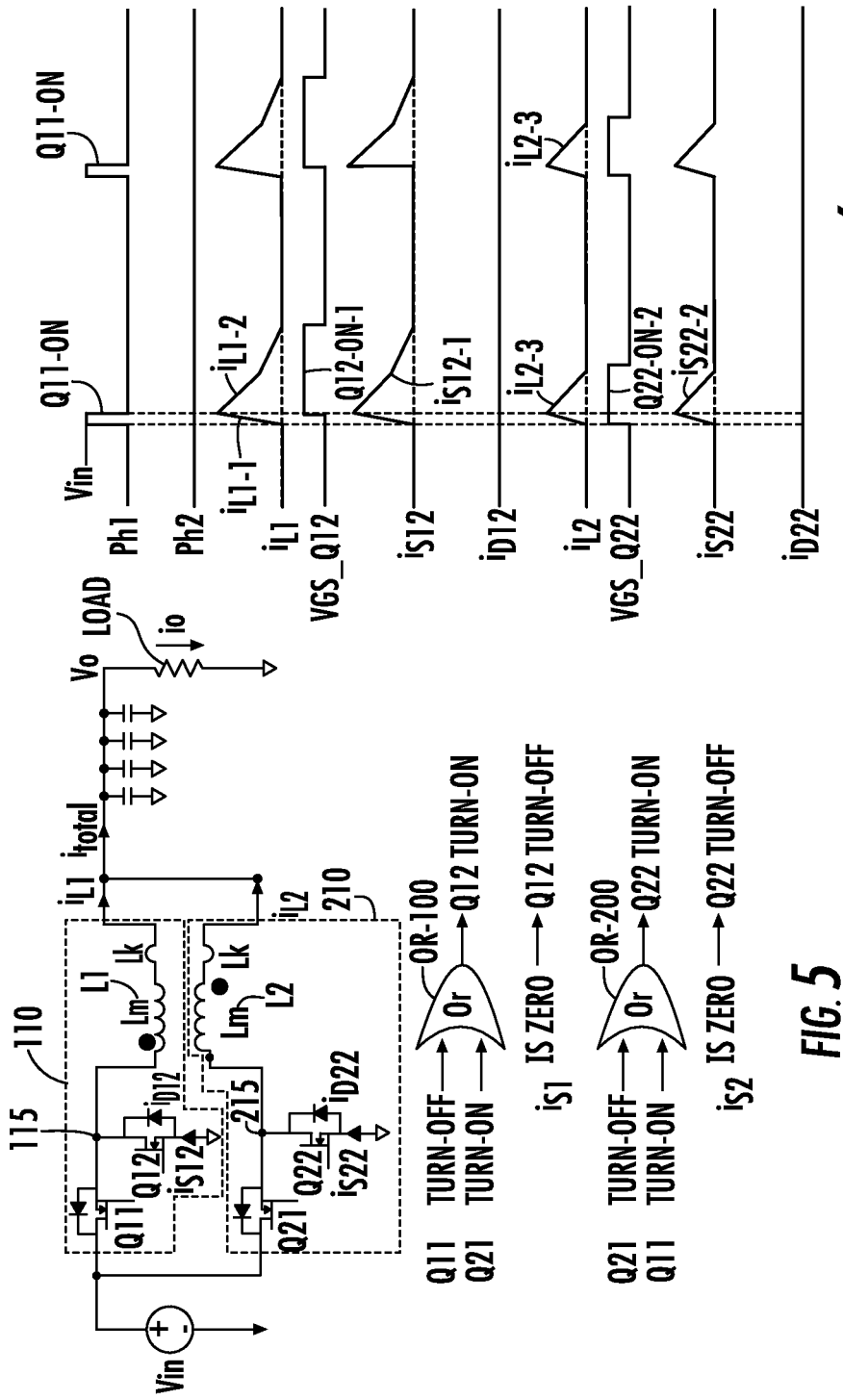

COUPLED-INDUCTOR POWER-SUPPLY CONTROLLER FOR OPERATING A POWER SUPPLY IN A REDUCED-POWER-DISSIPATION MODE

PRIORITY CLAIM

The present application is a continuation in-part of U.S. patent application Ser. No. 12/259,220, filed Oct. 27, 2008; which is a continuation of U.S. patent application Ser. No. 11/519,516 filed Sep. 12, 2006, now U.S. Pat. No. 7,443, 146, issued Oct. 28, 2008; which claims the benefit of U.S. Provisional Patent Application Ser. No. 60/747,945, filed May 23, 2006.

BACKGROUND

A power supply may convert an input voltage having a first set of characteristics into an output voltage having another set of characteristics. For example, a power supply may convert 110 VAC from a power outlet into 9 VDC for powering or recharging the battery of a cell phone.

A DC-DC converter is a type of power supply that is widely used to supply DC power to electronic devices, such as computers, printers, and the like, and that is available in a variety of configurations for deriving a regulated DC output voltage from a DC source of input voltage. As a non-limiting example, a buck-mode or step-down DC-DC converter generates a regulated DC output voltage whose value is less than the value of the DC source voltage. A step-down DC-DC converter may include one or more power channels or phases, the outputs of which are combined at an output node for delivering a regulated stepped-down DC output voltage to a load. Each phase includes power switches and a current-flow path that includes a filter inductor. The power switches are, for example, controllably switched by a pulse-width-modulation (PWM) signal produced by a PWM modulator to switchably connect a DC source voltage to one end of the filter inductor, a second end of which is connected to the output node. Alternatively, the power switches may be controllably switched by constant-on-time pulses, constant-off-time pulses, or other types of pulses.

In addition to regulator implementations which have no mutual magnetic coupling among the filter inductors, there are regulator configurations which provide magnetic coupling among the filter inductors. These 'coupled-inductor' DC-DC converters have become increasingly attractive for supplying power to portable electronic devices, such as, but not limited to, notebook computers, and the like, which may operate in a discontinuous current mode (DCM) during low or relatively light load (e.g., quiescent or 'sleep' mode) conditions to reduce power loss and preserve battery life. For DCM operation, the upper and lower MOSFETs of at least one respective power switching stage of the converter are turned off for part of the switching period, preventing polarity reversal of the inductor current, so that the inductor current is zero during part of the switching period, i.e. it is discontinuous, rather than a continuous, thereby reducing current to the output to accommodate the relatively light current demand during such low-load conditions.

A non-limiting example of a conventional dual-phase, coupled-inductor buck-mode regulator or DC-DC converter, in which the filter inductors of the respective phases are mutually coupled with one another, is diagrammatically illustrated in FIG. 1. The dual-phase regulator of FIG. 1 comprises two phases that produce respective output currents $i_{L1}$ and $i_{L2}$, which flow from phase nodes 115 and 215 of respective phases 110 and 210 through respective filter inductors L1 and L2, which are mutually coupled with one another, such that a current magnetically induced in one phase by a switched or driven current flowing in the other stage flows in the same direction (from the phase node into the output node OUT) as the driven (inducing) current. These two currents are summed at an output node OUT to produce a composite or total output current $I_{total}$. Output node OUT provides a regulated output voltage Vo for powering a device LOAD, such as the microprocessor of a notebook computer, through which a load current $i_o$ flows.

In order to regulate the output voltage Vo, the voltage at the output node OUT is fed back to an error amplifier (EA) 310, which is operative to compare the monitored output voltage Vo with a reference voltage VID. The voltage-difference output Comp of the error amplifier 310 is supplied to a power-supply controller 315. For example, the controller 315 is operable to control the pulse widths of associated streams of pulse-width-modulation (PWM) waveforms that are applied by respective PWM generators within the controller to driver circuits, the outputs of which are coupled to the gates of, and control the on/off switching times of, the upper and lower switching devices (MOSFETs Q11/Q21 and MOSFETs Q12/Q22) of the phases 110 and 210. In an example application, the PWM waveforms are sequenced and timed such that the interval between rising edges (or in some implementations, falling edges) thereof is constant to substantially equalize the output currents $i_{L1}$ and $i_{L2}$ of the two power channels.

In addition to monitoring the output voltage Vo, error amplifier 310 may also monitor the sum of the phase currents $i_{L1}+i_{L2}$ via respective sense resistors $R_{sn1}$ and $R_{sn2}$, which are coupled between the phase nodes 115 and 215 and a first, non-inverting (+) input 321 of a (K gain) transconductance amplifier 320. Amplifier 320 has a second, inverting (−) input 322 coupled to the output node OUT, and a sense capacitor $C_{sns}$ connected across its inputs. The amplifier 320 allows the sum of the phase currents to be used to regulate the output resistance of the power supply according to a technique commonly known as droop regulation or load-line regulation. The voltage output Vdroop of the amplifier 320 is coupled to a first input 331 of a summer 330, a second input 332 of which is coupled to the output node OUT. The Vdroop voltage output (which is typically negative) of amplifier 320 is added to the output voltage Vo to provide a difference voltage Vdiff that is coupled to a first, inverting (−) input 311 of error amplifier 310. The second, non-inverting (+) input 312 of error amplifier 310 is coupled to receive the reference voltage VID. As described above, the output voltage Comp of error amplifier 310 is used by the controller 315 to control the pulse widths of the PWM waveforms that control the on/off switching of the upper and low MOSFETs of the phases 110 and 210.

Examples of these PWM waveforms are shown in FIG. 2 as including a first PWM waveform PH1, which is used to control the on/off switching of the upper MOSFET switch Q11 of the first phase 110, and a second PWM waveform PH2, which is used to control the on/off switching of the upper MOSFET switch Q21 of the second phase 210. For balanced-phase operation, the frequencies of the two PWM waveforms are substantially the same and the times of occurrence of the turn-on pulses Q11-ON of the first PWM waveform PH1 are midway between the times of occurrence of the turn-on pulses Q21-ON of the second PWM waveform PH2, and vice versa. That is, the turn-on pulses Q11-ON are spaced approximately 360°/N=180° from the turn-on pulses Q21-ON, where N=2=the number of power-supply phases. During the intervals that the pulses of the waveforms PH1 and PH2 are high, MOSFETs Q11 and Q21 are turned on thereby, so that increasing or ramping up segments $i_{L1-1}$ and $i_{L2-1}$ of respective currents $i_{L1}$ and $i_{L2}$ flow therethrough and, via phase nodes 115 and 215, through mutually coupled inductors L1 and L2 to the output node OUT.

As further shown in FIG. 2, when the turn-on pulse Q11-ON of the PWM waveform PH1 goes low, a PWM waveform $V_{GS\_Q12}$, which is used to control the on/off switching of the lower MOSFET switch Q12 of the first phase 110, transitions high for a prescribed period Q12-ON, corresponding to the pulse-width interval of PWM waveform $V_{GS\_Q12}$. With MOSFET switch Q12 turned on during this interval, the inductor current $i_{L1}$ of the first channel gradually decreases or ramps down to zero from its peak value at the end of the duration of the turn-on pulse Q11-ON of PWM waveform PH1, as shown at $i_{L1-2}$. The ramping down portion $i_{L1-2}$ of the output current $i_{L1}$ is supplied by a portion $i_{S12-1}$ of a current $i_{S12}$ that flows from ground through the source-drain path of the active MOSFET Q12 to phase node 115 and into the inductor L1.

In a like manner, when the turn-on pulse Q21-ON of the PWM waveform PH2 goes low, a PWM waveform $V_{GS\_Q22}$, which is used to control the on/off switching of the lower MOSFET switch Q22 of the second phase 210, transitions high for a prescribed period Q22-ON corresponding to the pulse-width interval of PWM waveform $V_{GS\_Q22}$. With MOSFET switch Q22 turned on during this interval, the inductor current $i_{L2}$ of the second phase gradually ramps down to zero from its peak value at the end of the duration of the turn-on pulse Q21-ON of PWM waveform PH2, as shown at $i_{L2-2}$. The ramping down portion $i_{L2-2}$ of the output current $i_{L2}$ is supplied by a portion $i_{S22}$ of a current $i_{S22}$ that flows from ground through the source-drain path of the active MOSFET Q22 to phase node 215 and into the inductor L2.

As pointed out above, because the inductor L1 of the phase 110 is mutually coupled with the inductor L2 of the phase 210, the current $i_{L1}$ driven through inductor L1 as a result of the successive PWM-controlled turn on of the MOSFETs Q11 and Q12 magnetically induces a current in the inductor L2 of the second phase, shown in the current waveform $i_{L2}$ of FIG. 2 as induced current $i_{L2-3}$. Because the upper MOSFET Q21 of the second phase is off during this time (PH2 is low), and the polarity of its inherent body-diode is oriented so as to inherently block the flow of current therethrough from the input voltage supply rail Vin to phase node 215, no current is drawn through the upper MOSFET Q21 to supply the induced current $i_{L2-3}$. MOSFET Q22 of the second phase is also off at this time, since its switching PWM waveform $V_{GS\_Q22}$ is low. However, the orientation of its body-diode allows the flow of a current $i_{S22-2}$ from ground and through this body-diode as a body-diode current $i_{D22}$ to phase node 215 and into inductor L2 as the induced current $i_{L2-3}$.

In like manner, the current $i_{L2}$ through inductor L2 that results from the successive PWM-controlled turn on of the MOSFETs Q21 and Q22 magnetically induces a current in the inductor L1 of the first phase, shown in the current waveform $i_{L1}$ of FIG. 2 as induced current $i_{L1-3}$. Because the upper MOSFET Q11 of the first phase is off and the polarity of its inherent body-diode is oriented so as to inherently block the flow of current therethrough from the input voltage supply rail Vin, no current is drawn through the upper MOSFET Q11 to provide the induced current $i_{L1-3}$. However, even though the lower MOSFET Q12 of the first phase is off because its switching PWM waveform $V_{GS\_Q12}$ is low, the polarity orientation of its body-diode is such as to allow the flow of a current $i_{S12-2}$ from ground and through the body-diode as a body-diode current $i_{D12}$ to phase node 115 and into inductor L1 as the induced current $i_{L1-3}$.

Unfortunately, because the two induced currents $i_{L1-3}$ and $i_{L2-3}$ are supplied by way of respective currents $i_{D12}$ and $i_{D22}$ through the body diodes of lower MOSFETs Q12 and Q22, these induced currents may cause significant conduction losses in these MOSFETs.

SUMMARY

An embodiment of a power-supply controller includes first and second circuits. The first circuit is operable to cause a first current to flow through a first phase of a power supply. And the second circuit is operable to cause the second phase of the power supply to operate in a reduced-power-dissipation mode for at least a portion of a time period during which a second current magnetically induced by the first current flows through the second phase. For example, the second circuit may cause the second phase to operate in a reduced-power-dissipation mode by bypassing a diode (e.g., a stand-alone circulation diode or the inherent diode of a circulation transistor) of the second phase with a switch or other low-impedance path, or by activating the circulation transistor.

BRIEF DESCRIPTION OF THE DRAWINGS

FIG. 5 is a reduced complexity, diagrammatic illustration of a second embodiment of a buck-mode regulator for the case of single-phase DCM operation;

FIG. 6 shows waveform diagrams associated with the single-phase DCM operation of the buck-mode regulator of FIG. 5;

DETAILED DESCRIPTION

In general, in an embodiment, the functionality of a regulator's controller is augmented, such that the waveforms it produces to control the on/off switching of the low-side MOSFETs of the power-supply phases include auxiliary pulse signals having widths that at least partially coincide with the durations of the induced currents in the phases. As a result, rather than flowing as respective body-diode currents through the body-diodes of the low-side MOSFETs, the induced currents flow instead, at least part of the time, through the turned-on low-side MOSFETs, or through other lower-impedance bypass paths, thereby reducing or eliminating conduction losses in their body-diodes.

Figures 1, 2:
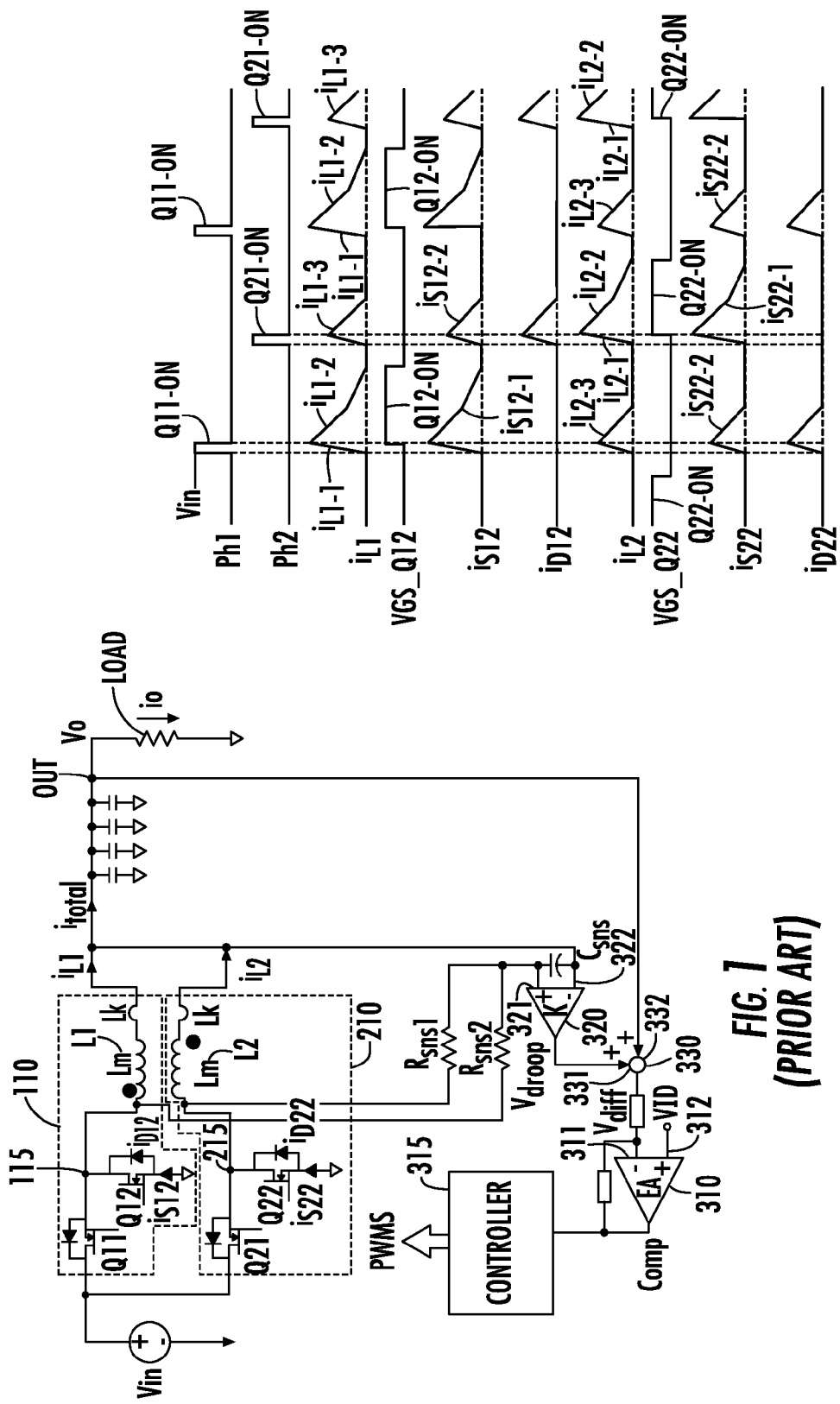
FIG. 1 diagrammatically illustrates the overall circuit architecture of a non-limiting example of a conventional dual-phase, coupled inductor, buck-mode regulator, in which the filter inductors of the regulator's phases are mutually coupled with one another.
FIG. 2 shows waveform diagrams associated with DCM operation of the conventional dual-phase, buck-mode regulator of FIG. 1.
Figures 3, 4:
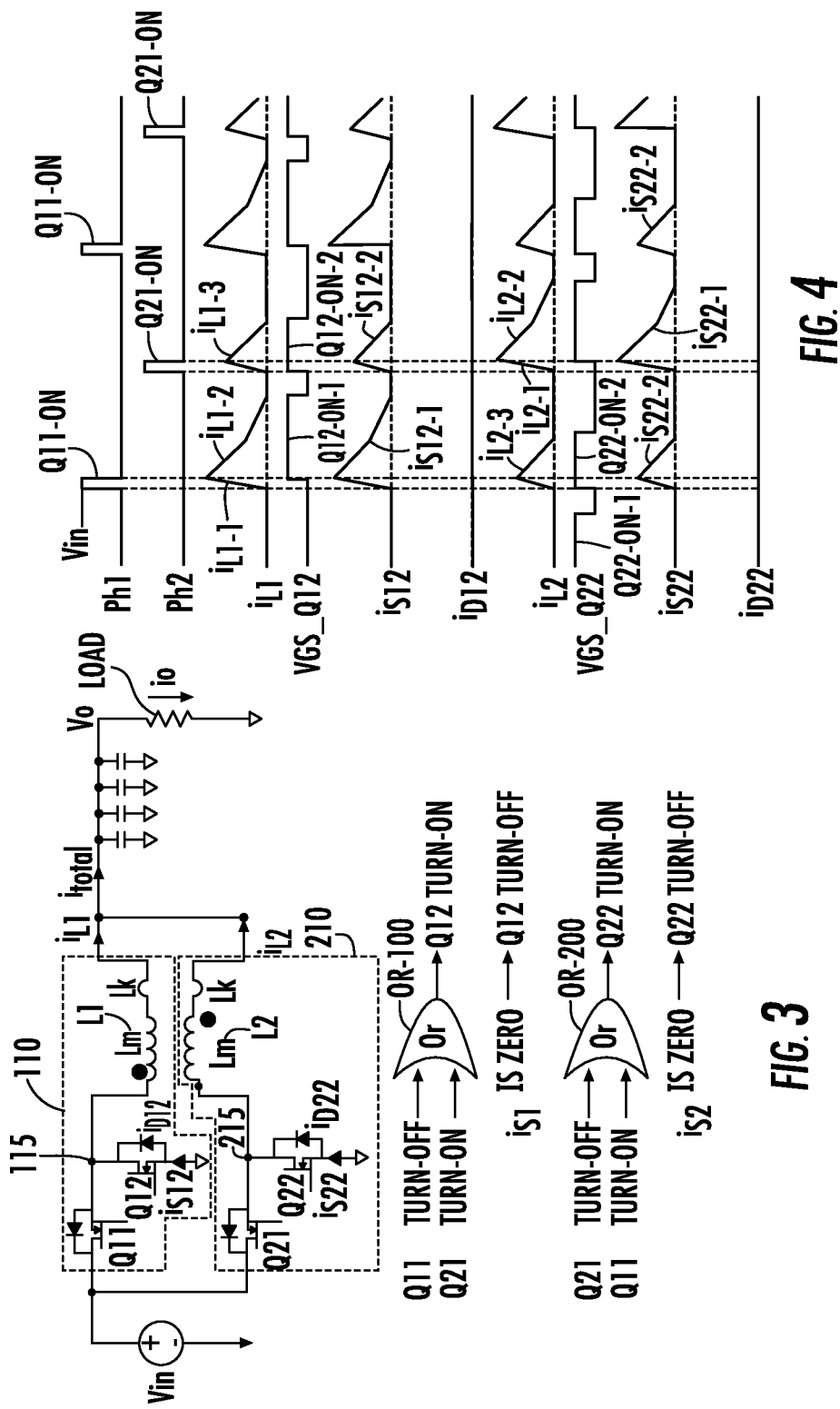
FIG. 3 is a reduced complexity, diagrammatic illustration of a first embodiment of a buck-mode regulator for the case of dual-phase DCM operation.
FIG. 4 shows waveform diagrams associated with DCM operation of the dual-phase, buck-mode regulator of FIG. 3.

Attention is initially directed to FIG. 3 which is a reduced complexity, diagrammatic illustration of a first embodiment for the case of a dual-phase, discontinuous conduction mode (DCM) operation of a buck-mode type of regulator, and to FIG. 4, which shows a set of waveform diagrams associated with the operation of FIG. 3. More particularly, the circuit architecture diagram of FIG. 3 shows two phases that may be similar to the phases of the regulator architecture of FIG. 1, but omits an illustration of the feedback connections to the controller, to simplify the drawing.

Instead, the augmentation of the functionality of the supervisory controller is represented in FIG. 3 by a pair of OR gate functions OR-100 and OR-200, that are employed by the power-supply controller to insert additional or auxiliary on-time pulse-width portions into the respective switching waveforms $V_{GS\_Q12}$ and $V_{GS\_Q22}$ (PWM waveforms in this embodiment), and are effective to turn on the low-side MOSFETs Q12 and Q22 of respective phases 110 and 210 at times that at least partially coincide with the durations of the induced currents in the filter inductors L1 and L2. Although shown as OR gates, the OR gate functions OR-100 and OR-200 may be implemented with any other suitable circuitry.

To this end, the OR gate function OR-100 for phase 110 has a first input coupled to monitor the turning-off of the upper switching MOSFET Q11, which occurs at a high-to-low transition of the pulse Q11-ON of PWM waveform PH1, and a second input coupled to monitor the turning-on of the upper switching MOSFET Q21 of the opposite phase 210, which occurs at a low-to-high transition of the pulse Q21-ON of PWM waveform PH2. When either of these events occurs, the PWM waveform $V_{GS\_Q12}$, which is used to control the on/off switching of lower switching MOSFET switch Q12 of phase 110, transitions from low-to-high.

In particular, in response to a high-to-low transition of the pulse Q11-ON of PWM waveform PH1, the PWM waveform $V_{GS\_Q12}$ transitions from low-to-high for a first pulse width interval Q12-ON-1; in addition, in response to a low-to-high transition of the pulse Q21-ON of PWM waveform PH2, PWM waveform $V_{GS\_Q12}$ transitions from low-to-high for a second or auxiliary pulse width interval Q12-ON-2. As a consequence, both the ramping down portion $i_{L1-2}$ of the driven, i.e., non-induced current ($i_{L1-1}+i_{L1-2}$) through inductor L1 and the entirety of the current $i_{L1-3}$ induced therein by the non-induced current ($i_{L2-1}+i_{L2-2}$) flowing through inductor L2 will flow through the source-drain path of active lower MOSFET Q12. None of the induced current flowing through inductor L1 will flow as a body-diode current $i_{D12}$ through the body-diode of MOSFET Q12, so as to eliminate an associated conduction loss in the body-diode of MOSFET Q12. To control the turn-off of the lower MOSFET switch Q12, its source-drain current $i_{S12}$ is monitored by conventional current monitoring circuitry, examples of which are disclosed in U.S. application Ser. No. 12/189,112, which is incorporated by reference. Whenever the source-drain current $i_{S12}$ goes to zero, the PWM waveform $V_{GS\_Q12}$ transitions from high-to-low, so that the lower MOSFET switch Q12 is turned off. This prevents a reverse current from flowing from the LOAD or from the filter capacitors back through the first phase 110.

In a similar manner, the OR gate function OR-200 for phase 210 has a first input coupled to monitor the turning-off of the upper switching MOSFET Q21, which occurs at a high-to-low transition of the pulse Q21-ON of PWM waveform PH2, and a second input coupled to monitor the turning-on of the upper switching MOSFET Q11 of the opposite power switching stage 110, which occurs at a low-to-high transition of the pulse Q11-ON of PWM waveform PH1. When either of these events occurs, the PWM waveform $V_{GS\_Q22}$, which is used to control the on/off switching of the lower switching MOSFET switch Q22 of the phase 210, transitions from low-to-high.

More particularly, in response to a high-to-low transition of the pulse Q21-ON of PWM waveform PH2, the PWM waveform $V_{GS\_Q22}$ transitions from low-to-high for a first pulse width interval Q22-ON-1; in addition, in response to a low-to-high transition of the pulse Q11-ON of PWM waveform PH1, PWM waveform $V_{GS\_Q22}$ transitions from low-to-high for a second or auxiliary pulse width interval Q22-ON-2. As a consequence, both the ramping down portion $i_{L2-2}$ of the non-induced current ($i_{L2-1}+i_{L2-2}$) through inductor L2 and the entirety of the current $i_{L2-3}$ induced therein by the non-induced current ($i_{L1-1}+i_{L1-2}$) flowing through inductor L1 will flow through the source-drain path of active lower MOSFET Q22. None of the induced current flowing through inductor L2 will flow as a body-diode current $i_{D22}$ through the body-diode of MOSFET Q22, so as to eliminate an associated conduction loss in the body-diode of MOSFET Q22. To control the turn-off of the lower MOSFET switch Q22, its source-drain current $i_{S22}$ is monitored by conventional monitoring circuitry. Whenever the source-drain current $i_{S22}$ goes to zero, the PWM waveform $V_{GS\_Q22}$ transitions from high-to-low, so that the lower MOSFET switch Q22 is turned off.

Still referring to FIGS. 3 and 4, alternate embodiments are contemplated. For example, the power-supply controller may not activate the low-side MOSFET Q22 for the entire duration of the induced current $I_{L2-3}$ through the inductor L2, thus reducing, but not eliminating, the time during which an induced current flows through the body diode of Q22. This may be due to an inherent or intentional circuit delay that prevents Q22 from turning on until a delay time after Q11 turns on. Or, this may be due to the power-supply controller inactivating Q22 in response to $I_{L2-2}$ being below a threshold voltage that is greater than zero, such that Q22 is off for a period of time before $I_{L2-3}$ becomes equal to zero. In another embodiment, the power supply controller may activate Q22 for longer than the duration of $I_{L2-3}$. In yet another embodiment, the power supply controller may activate Q22 before the start of the $I_{L2-3}$ duration and inactivate Q22 before the end of the $I_{L2-3}$ duration, or may activate Q22 after the start of the $I_{L2-3}$ duration and inactivate Q22 after the end of $I_{L2-3}$ duration. In another embodiment, the power supply controller may only partially activate Q22 such that is not full on, but is sufficiently on to bypass its body diode. Similar alternate embodiments are contemplated for the low-side MOSFET Q12, for example, such that the power-supply controller may not activate the low-side MOSFET Q12 for the entire duration of the induced current $I_{L1-3}$ through the inductor L1, thus reducing, but not eliminating, the time during which an induced current flows through the body diode of Q12. Consequently, in such alternate embodiments, the conduction losses in the body-diodes of the MOSFETS Q12 and Q22 may be reduced but not eliminated. Furthermore, although shown as a two-phase buck converter, the power supply of FIG. 3 may have more than two phases and may be other than a buck converter. Moreover, where the power supply has more than two phases, then at least one of the phases may be magnetically uncoupled from the other phases, or the phases may be grouped such that each phase may be magnetically coupled to the other phases within its group but magnetically uncoupled from phases outside of its group. In addition, although shown coupled to ground, the low-side transistors Q12 and Q22 (and also the filter capacitors and the load) may be coupled to a negative input voltage. Furthermore, instead of sourcing current to the LOAD, one may modify the power supply to sink current from the LOAD, in which case the transistors Q11 and Q21 may be the circulation transistors, and at least some of the transistors Q11, Q12, Q21, and Q22 may be replaced with PMOS transistors. Also, instead of being a PWM controller, the controller may be a constant-on-time, constant-off-time, or another type of controller.

The circuit architecture diagram of FIG. 5 and its associated set of waveforms shown in FIG. 6 correspond to the case of providing normal PWM switching signals for only one of the power-supply phases—phase 110 in this embodiment—of the dual-phase discontinuous conduction mode converter described above in conjunction with FIGS. 3 and 4. In this second embodiment, there is no PH2 pulse for turning on the upper MOSFET switch Q21 of the phase 210. As such, the inputs to OR gate functions OR-100 and OR-200 associated with the turn-on and turn-off of MOSFET Q21 are zero. Moreover, since there is no PH2 pulse that initiates the flow of a non-induced current $I_{L2}$ through the inductor L2, the PWM waveform $V_{GS\_Q22}$ does not transition from low-to-high for a prescribed duration Q22-ON-1 associated with the ramp down of a (non-existent) non-induced portion of current $i_{L2}$ through the inductor L2 at the end of the (non-existent) PH2 pulse (since there is no non-induced current $i_{L2}$ flowing through inductor L2 to begin with). As a consequence, the PWM waveform $V_{GS\_Q12}$ for lower MOSFET switch Q12 of the phase 110 does not require an auxiliary pulse-width portion (shown at Q12-ON-2 in FIG. 4), to turn on the lower MOSFET switch Q12 of phase 210 to accommodate an (non-existent) induced current through inductor L1.

However, in this second, single-active-phase DCM embodiment of FIGS. 5 and 6, there is an induced current $i_{L2-3}$ that flows through the inductor L2 of the power-supply phase 210, as a result of the flow of the non-induced current $i_{L1}$ through inductor L1 during the normal operation of the upper and lower MOSFETS Q11 and Q12 of the phase 110. To prevent this induced current $i_{L2-3}$ from being supplied by way of the body-diode of the lower MOSFET Q22 of the phase 210, the pulse-width portion Q22-ON-2 of the PWM waveform $V_{GS\_Q22}$ of the first, dual-active-phase DCM embodiment FIGS. 3 and 4 is used in this second, single-active-phase DCM embodiment of FIGS. 5 and 6 to turn on, and to provide for the flow of source-drain current $i_{S22}$ through, the active lower MOSFET Q22 while the induced current $i_{L2-3}$ flows in the second phase 210. The time of occurrence and duration of the pulse width Q22-ON-2 of PWM waveform $V_{GS\_Q22}$ may be the same as the time of occurrence and duration of the induced current $i_{L2-3}$, as in the first embodiment of FIGS. 3 and 4. As a result, as in the first embodiment of FIGS. 3 and 4, all of the induced current ($i_{L2-3}=i_{S22-2}$) flowing through inductor L2 will flow through turned-on low side MOSFET Q22, rather than through its body-diode as a body-diode current $i_{D22}$, so as to eliminate an associated conduction loss in the body-diode of MOSFET Q22.

Alternate embodiments similar to at least some of those discussed above in conjunction with FIGS. 3 and 4 are contemplated for the circuitry and techniques of FIGS. 5 and 6. For example, the power-supply controller may not activate the low-side MOSFET Q22 for the entire duration of the induced current $I_{L2-3}$ through the inductor L2, thus reducing, but not eliminating, the time during which an induced current flows through the body diode of Q22. Consequently, in such alternate embodiments, the conduction loss in the body-diode of MOSFET Q22 may be reduced but not eliminated.

Figures 7, 8:
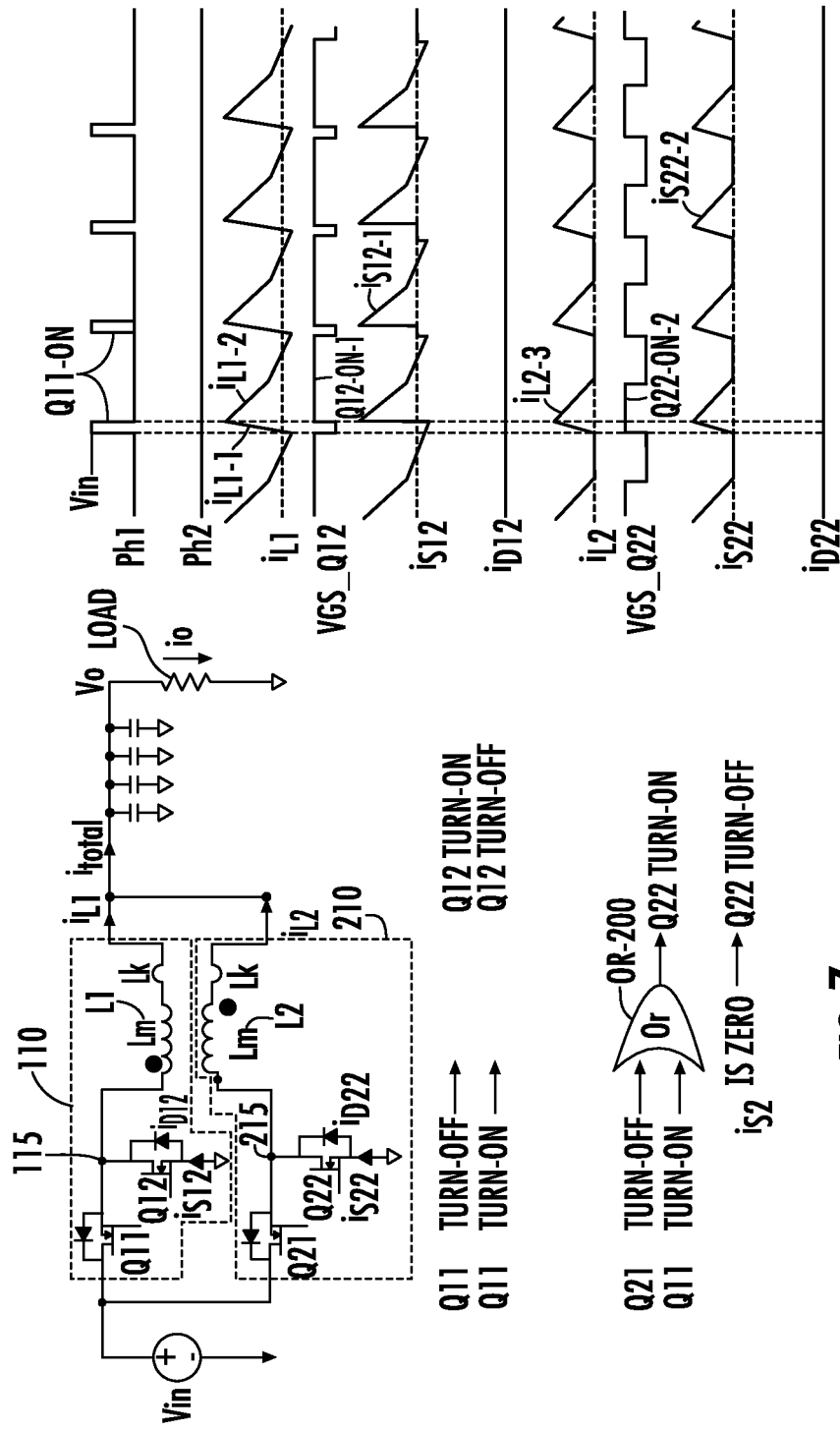
FIG. 7 is a reduced complexity, diagrammatic illustration of a third embodiment of a buck-mode regulator for the case of a single-phase CCM (continuous mode) operation.
FIG. 8 shows waveform diagrams associated with the single-phase CCM operation of the buck-mode regulator of FIG. 7.

FIG. 7 is a reduced complexity, diagrammatic illustration of a third embodiment for the case of a single-active-phase CCM operation of the buck-mode regulator, while FIG. 8 shows a set of waveform diagrams associated with the operation of the circuit architecture of FIG. 7. For CCM single-active-phase operation, the upper and lower MOSFETs Q11 and Q12 of the power-supply phase 110 are turned on and off in a complementary manner, so that a conductive path for current flow through the inductor L1 and one or the other of the respective terminals (Vin and ground) of the input power supply will be continuously provided through one or the other of these MOSFETs. Thus, the inductor current $i_{L1}$ through the filter inductor L1 is repetitively ramped up and down between positive and negative peaks thereof, as the complementary PWM waveforms PH1 and $V_{GS\_Q12}$ alternately turn MOSFETs Q11 and Q12 on and off, as shown in the waveform diagram of FIG. 8.

Similar to the diagrammatic illustrations of the respective dual-active-phase and single-active-phase DCM embodiments of FIGS. 3 and 5, the circuit architecture diagram of FIG. 7 is substantially the same as the DCM buck-mode regulator of FIGS. 3 and 5, but lacks an illustration of the feedback connections (e.g., FIG. 1) to the power-supply controller to simplify the drawing. Instead, as in the circuit architecture diagrams of FIGS. 3 and 5, FIG. 7 shows a control diagram representative of the control function that is executed by the power-supply controller, to control the turn-on and turn-off times of the high-side MOSFET Q11 and the low-side MOSFET Q12 of the phase 110 by respective PWM complementary switching waveforms PH1 and $V_{GS\_Q12}$, as well as the OR gate function OR-200 that is used to control auxiliary turn-on and turn-off times of the low side MOSFET Q22 of the inactive phase 210, in accordance with PWM waveform $V_{GS\_Q22}$, at times that coincide with the durations of currents magnetically induced in the inductor L2 of the phase 210.

More particularly, as in the single-active-phase DCM regulator embodiment of FIGS. 5 and 6, in the single-active-phase CCM regulator embodiment of FIGS. 7 and 8, there is no PH2 pulse for turning on the upper MOSFET switch Q21 of the phase 210. As such, the input to OR-gate function OR-200 associated with the turn-off of MOSFET Q21 is zero. Moreover, since there is no PH2 pulse that initiates the flow of a non-induced current $I_{L2}$ through the inductor L2, the PWM waveform $V_{GS\_Q22}$ does not transition from low-to-high for a prescribed duration Q22-ON-1 associated with the ramp down of a (non-existent) non-induced portion of current $i_{L2}$ through the inductor L2 at the end of the (non-existent) PH2 pulse (since there is no non-induced current $i_{L2}$ flowing through inductor L2 to begin with). As a consequence, the PWM waveform $V_{GS\_Q12}$ for the lower MOSFET switch Q12 of power switching stage 110 does not require an auxiliary pulse-width portion (shown at Q12-ON-2 in FIG. 4), to turn on the lower MOSFET switch Q12 of the phase 210 to accommodate a (non-existent) induced current through inductor L1.

However, as in the single-active-phase DCM embodiment of FIGS. 5 and 6, there is an induced current $i_{L2\text{-}3}$ that flows through the inductor L2 as a result of the flow of the non-induced current $i_{L1}$ through inductor L1 during the normal operation of the upper and lower MOSFETS Q11 and Q12 of phase 110. To prevent this induced current $i_{L2\text{-}3}$ from being supplied by way of the body-diode of the lower MOSFET Q22 of the phase 210, the pulse-width portion Q22-ON-2 of the PWM waveform $V_{GS\_Q22}$ of FIG. 4 is again used to turn on and provide for the flow of source-drain current $i_{S22}$ through the active lower MOSFET Q22 for the duration of the induced current $i_{L2\text{-}3}$. The time of occurrence and duration of the pulse width Q22-ON-2 of PWM waveform $V_{GS\_Q22}$ is substantially the same as the time of occurrence and duration of the induced current $i_{L2\text{-}3}$, as in the embodiments of FIGS. 3-6. As a result, as in the embodiments of FIGS. 3-6, all of the induced current ($i_{L2\text{-}3} = i_{S22\text{-}2}$) flowing through inductor L2 will flow through turned-on low side MOSFET Q22, rather than through its body-diode as a body-diode current $i_{D22}$, eliminating conduction loss in the body-diode of MOSFET Q22.

Alternate embodiments similar to at least some of those discussed above in conjunction with FIGS. 3-6 are contemplated for the circuitry and techniques described in conjunction with FIGS. 7 and 8. For example, the power-supply controller may not activate the low-side MOSFET Q22 for the entire duration of the induced current $I_{L2\text{-}3}$ through the inductor L2, thus reducing, but not eliminating, the time during which an induced current flows through the body diode of Q22. Consequently, in such alternate embodiments, the conduction loss in the body-diode of MOSFET Q22 may be reduced but not eliminated.

Figure 9:
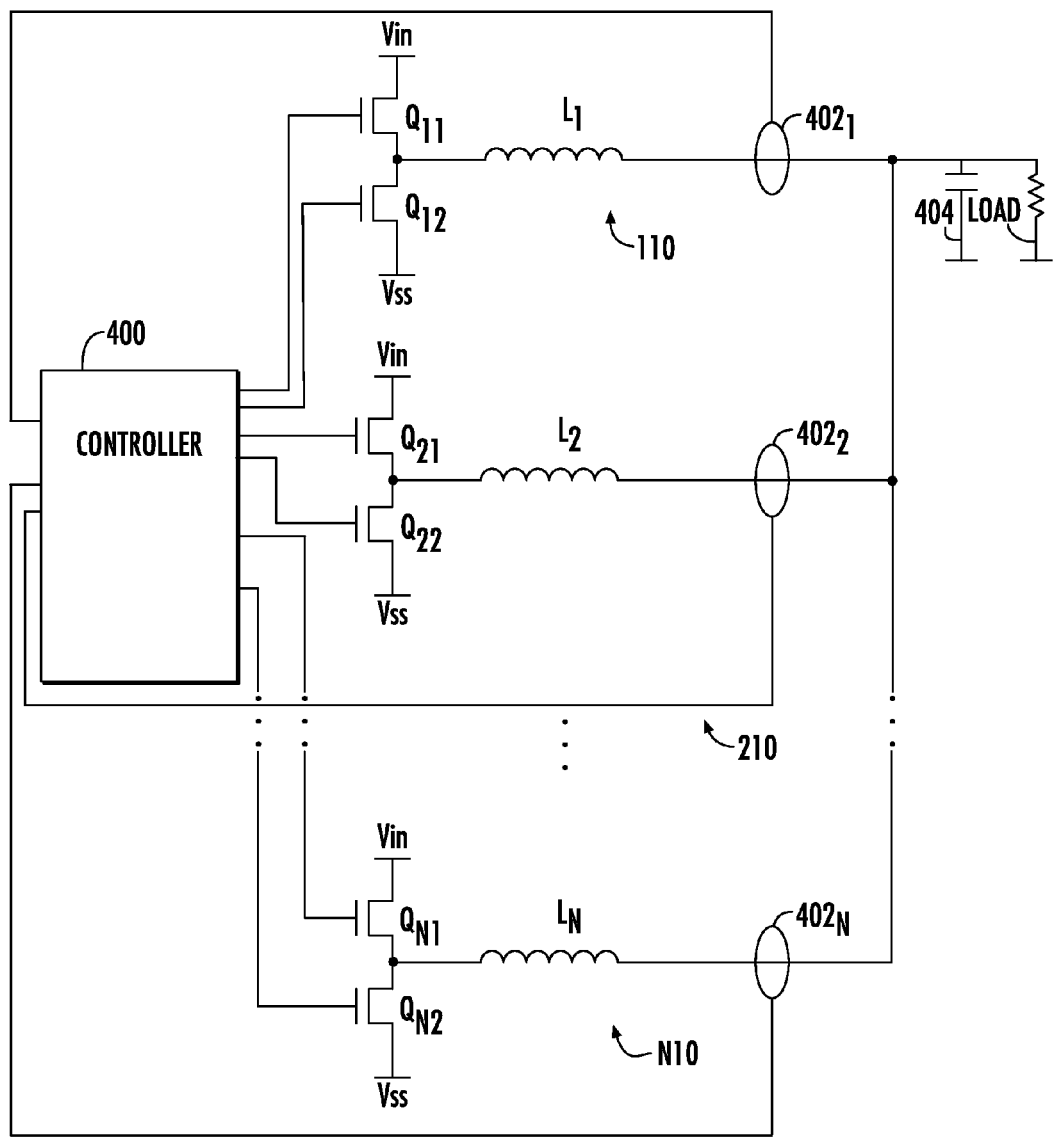
FIG. 9 is a reduced complexity, diagrammatic illustration of a fourth embodiment of a buck-mode regulator.

FIG. 9 is a diagrammatic illustration of another embodiment of a multistage coupled-inductor buck converter, where like numbers are used to reference like components relative to FIGS. 1-8.

In addition to the N phases 110, 210, . . . , and N10, the buck converter includes a power-supply controller 400, current sensors 402₁-402_N, and a filter capacitor 404. The current sensors 402₁-402_N may be conventional, such as disclosed in U.S. application Ser. No. 12/189,112, which is incorporated by reference.

A difference between the embodiments of FIGS. 3-8 and the embodiment of FIG. 9 is that the embodiment of FIG. 9 uses current sensors 402 instead of or in addition to an OR logic function to determine when to switch on and off the low-side, i.e., circulating transistors Q12-QN2.

For example, the controller 400 may activate Q12 for the entire time during which the sensor 402₁ senses a forward current (i.e., in this embodiment, a current flowing toward the load) flowing in the phase 110 while Q11 is open, or for any portion of this time. This allows an induced or a decaying non-induced current to flow through the active transistor Q12 instead of through the body diode of the inactive transistor Q12, and thus allows a reduction in the conduction losses in the transistor Q12.

Because a reverse phase current (i.e., in this embodiment, a current flowing away from the load) may be undesirable because it discharges the filter capacitor 404, the controller 400 may turn off Q12 in response to sensing a zero current, a reverse current, or a forward current below a predetermined threshold flowing through phase 110 while the transistor Q11 is open.

In another embodiment, the controller 400 may turn off Q12 in response to sensing a zero current, a reverse current, or a forward current below a predetermined threshold flowing through a phase other than the phase 110 while the transistor Q11 is open. For example, the controller 400 may turn off Q12 while Q11 is open in response to sensing a zero current, a reverse current, or a forward current below a predetermined threshold in each of the other phases 210-N10. The reasoning behind this is that when no forward currents are flowing through the other phases 210-N10, then no current is magnetically induced in the phase 110.

The controller 400 may control the circulation transistors Q22-QN2 in a similar manner.

Alternate embodiments of the power supply of FIG. 9 are contemplated. For example, embodiments similar to at least some of those discussed above in conjunction with FIGS. 3-8 are contemplated. In addition, although described as being coupled to a negative supply Vss, the low-side transistors Q12-QN2 may be coupled to ground, or to any other voltage lower than Vin.

Figure 10:
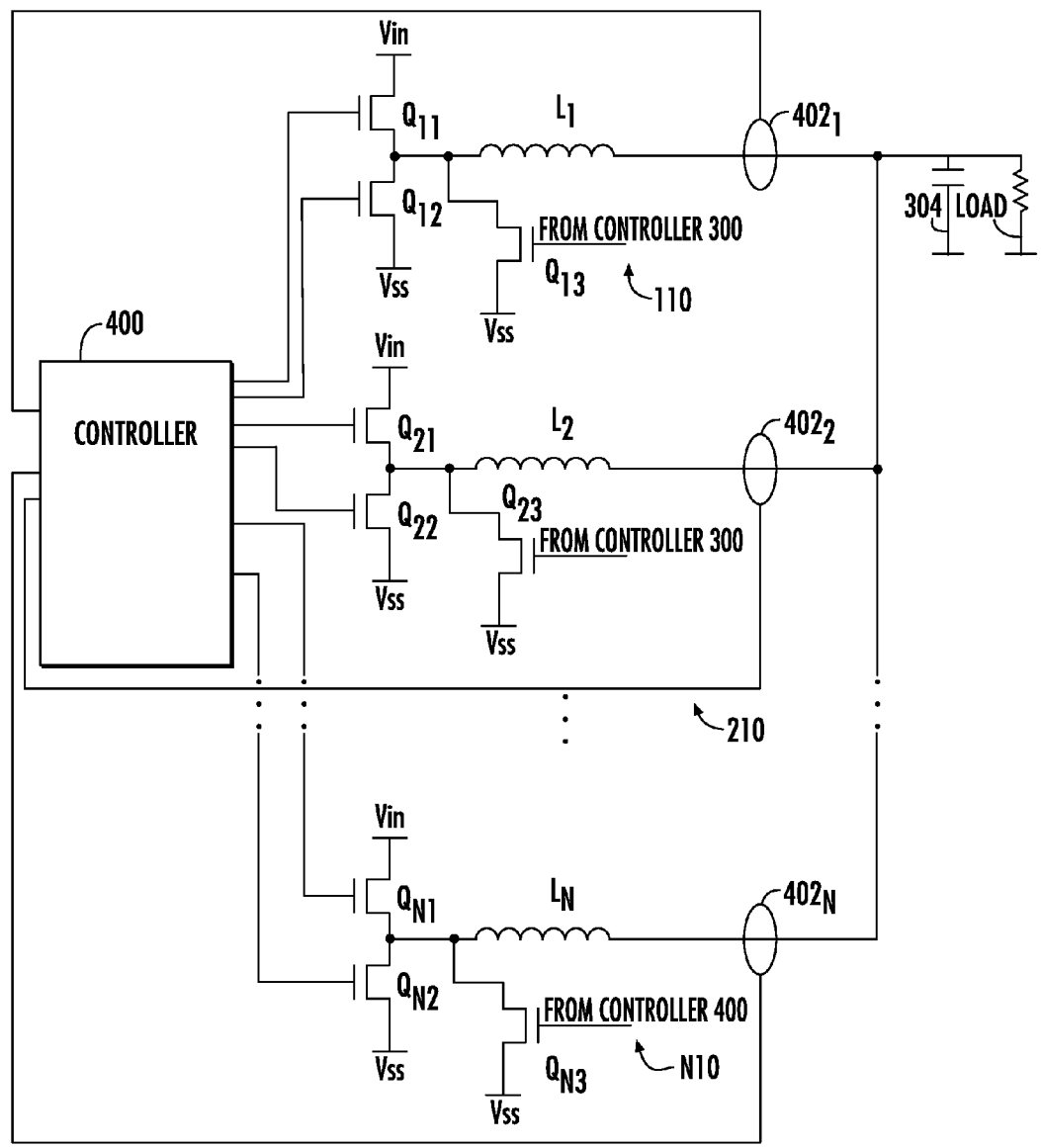
FIG. 10 is a reduced complexity, diagrammatic illustration of a fifth embodiment of a buck-mode regulator.

FIG. 10 is a diagrammatic illustration of another embodiment of a multistage coupled-inductor buck converter, where like numbers are used to reference like components relative to FIGS. 1-9.

This embodiment is similar to that of FIG. 9, except that each phase 110, 210, . . . , N10 respectively includes a shunt transistor Q13-QN3 that is coupled in parallel with a respective low-side transistor Q12-QN2 but that receives a separate gate-drive signal from the controller 400.

Therefore, to allow an induced or decaying current flowing in the phase 110 to bypass the body diode of the low-side transistor Q12, instead of activating Q12, the controller 400 may activate the transistor Q13. Or, the controller 400 may simultaneously activate both the transistors Q12 and Q13 to further lower the conduction losses caused by a decaying or induced current flowing in phase 110—in this latter embodiment, the gates of the transistors Q12 and Q13 may receive the same drive signal from the controller 400. Of course the controller 400 deactivates the transistor Q13 while the high-side transistor Q11 is closed.

The controller 400 may operate the shunt transistors Q23-QN3 in a similar manner.

Shunt transistors similar to the shunt transistors Q13-QN3 may also be included in the embodiments of FIGS. 3-8.

Still referring to FIG. 10, alternate embodiments are contemplated. For example, at least some of the alternate embodiments contemplated for the circuitry and techniques disclosed above in conjunction with FIGS. 3-9 are also contemplated for the embodiment of FIG. 10. Furthermore, each phase may have more than one shunt transistor coupled in parallel with the low-side transistor, or may have one or more shunt transistors coupled in parallel with the high-side transistor (to lower the on resistances of the high-side transistors). Moreover, fewer than all of the phases may include a shunt transistor.

As will be appreciated from the foregoing description, the problem of body-diode conduction loss in a coupled-inductor DC-DC converter may be successfully reduced or eliminated, by incorporating into the MOSFET switching control waveforms, through which the regulator's controller controls on/off switching of the low-side (or shunt) MOSFETs of the multiple power stages, having auxiliary on-time pulse width portions that at least partially coincide with the durations of the induced currents in the power-supply phases. As a result, rather than being forced to flow as respective body-diode currents through the body-diodes of the MOSFETs for their entire duration, the induced currents (or at least portions thereof) will flow through the turned-on MOSFETS (or shunt MOSFETS) themselves for at least part of their durations, thereby reducing or eliminating conduction losses in the low-side-transistor body-diodes.

While several embodiments are described, it is to be understood that the disclosure is not limited thereto but is susceptible to numerous changes and modifications, and we therefore do not wish to be limited to the details shown and described herein, but intend to cover all such changes and modifications.

What is claimed is:

1. A power-supply controller, comprising:
a first circuit configured to cause a first current to flow through a first phase of a power supply; and
a second circuit configured to cause a second phase of the power supply to operate in a reduced-power-dissipation mode by closing a reference-side switch of the second phase for no longer than a portion of a time period during which a second current magnetically induced by the first current flows through the second phase, the portion of the time period being less than the time period.

2. The power-supply controller of claim 1 wherein the first circuit is further configured to cause the first current to flow by closing a supply-side switch of the first phase.

3. The power-supply controller of claim 1 wherein the first circuit is further configured to cause the first current to flow by closing a first supply-side switch of the first phase and opening a first reference-side switch of the first phase.

4. The power-supply controller of claim 1 wherein the second circuit is further configured to cause the second phase to operate in the reduced-power-dissipation mode by activating a conduction path in parallel with the reference-side switch of the second phase.

5. The power-supply controller of claim 1 wherein the second circuit is further configured to cause the second phase to exit the reduced-power-dissipation mode by deactivating a conduction path in parallel with the reference-side switch of the second phase.

6. A power-supply controller, comprising:
a first circuit configured to open and close a first circulation element of a first power-supply phase;
a second circuit configured to lower and to raise a conduction impedance of a second circulation element of a second power-supply phase that is magnetically coupled to the first power-supply phase; and
a third circuit configured to cause the second circuit to lower the conduction impedance of the second circulation element for only a portion of a time during which the first circulation element is closed, the portion of the time being shorter than the time.

7. The power-supply controller of claim 6 wherein the third circuit is configured to cause the second circuit to lower the conduction impedance of the second circulation element by forming a low-impedance path across the second circulation element.

8. The power-supply controller of claim 6 wherein:
the second circuit is configured to open and close a second drive element of the second power-supply phase; and
the third circuit is configured to cause the second circuit to lower the conduction impedance of the second circulation element while the second drive element is open.

9. The power-supply controller of claim 6 wherein:
the second circuit is configured to open and close a second drive element of the second power-supply phase; and
the third circuit is configured to cause the second circuit to deactivate the second circulation element while the second drive element is closed.

10. A power supply, comprising:
a first voltage input node;
a reference node;
an output node configured to provide a regulated output signal;
a first phase coupled to the input, reference, and output nodes;
a second phase coupled to the input, reference, and output nodes and being magnetically coupled to the first phase; and
a power-supply controller, comprising:
a first circuit configured to cause a first current to flow from the input node, through the first phase, to the output node, and
a second circuit configured to cause the second phase of the power supply to operate in a reduced-power-dissipation mode by activating a second circulation switch of the second phase for no more than a portion of a time period during which a second current magnetically induced by the first current flows from the reference node, through the second phase, to the output node, the portion of the time period being smaller than the time period.

11. The power supply of claim 10 wherein:
the first phase comprises:
a first inductor having a first node and having a second node coupled to the output node,
a first drive switch coupled between the input node and the first node of the inductor, and
a first circulation switch coupled between the reference node and the first node of the inductor; and
the second phase comprises:
a second inductor having a first node and having a second node coupled to the output node and being magnetically coupled to the first inductor,
a second drive switch coupled between the input node and the first node of the second inductor, and
the second circulation switch coupled between the reference node and the first node of the second inductor.

12. The power supply of claim 10 wherein the regulated output signal comprises a regulated output voltage.

13. The power supply of claim 10, further comprising a capacitor coupled between the output node and the reference node.

14. The power supply of claim 10 wherein the reference node comprises a ground node.

15. The power supply of claim 10 wherein the reference node comprises a second voltage input node.

16. A power supply, comprising:
a first voltage input node;
a reference node;
an output node configured to provide a regulated output signal;
a first phase having a first drive switch coupled between the input and output nodes;
a second phase magnetically coupled to the first phase and having a second circulation element coupled between the reference and output nodes; and
a power-supply controller, comprising:
a first circuit configured to open and close the first drive switch,
a second circuit configured to cause a magnetically induced current that flows through the second phase to flow around, and to flow through, the second circulation element, and
a third circuit configured to cause the second circuit to cause the magnetically induced current to flow around the second circulation element for no longer than a fraction of a time during which the first drive switch is closed.

17. The power supply of claim 16 wherein:
the first phase comprises:
   a first inductor having a first node coupled to the first drive switch and having a second node coupled to the output node, and
   a first circulation switch coupled between the reference node and the first node of the inductor; and
the second phase comprises:
   a second inductor having a first node coupled to the second circulation element, having a second node coupled to the output node, and being magnetically coupled to the first inductor, and
   a second drive switch coupled between the input node and the first node of the second inductor.

18. The power supply of claim 16 wherein the regulated output signal comprises a regulated output voltage.

19. The power supply of claim 16, further comprising a capacitor coupled between the output and reference nodes.

20. The power supply of claim 16 wherein the reference node comprises a ground node.

21. The power supply of claim 16 wherein the reference node comprises a second voltage input node.

22. The power supply of claim 16 wherein the second circulation element comprises a diode.

23. The power supply of claim 16 wherein the second circulation element comprises an inherent diode of a second circulation transistor of the second phase.

24. A power supply, comprising:
a first voltage input node;
a reference node;
an output node configured to provide a regulated output signal;
a first phase having a first drive switch coupled between the input and output nodes;
a second phase magnetically coupled to the first phase and having a second circulation element coupled between the reference and output nodes;
a power-supply controller, comprising:
   a first circuit configured to open and close the first drive switch,
   a second circuit configured to bypass and unbypass the second circulation element, and
   a third circuit configured to cause the second circuit to bypass the second circulation element for at least a portion of a time during which the first drive switch is closed
wherein the second circulation element comprises a second circulation transistor and a diode;
wherein the second circuit is configured to bypass the diode by activating the second circulation transistor; and
wherein the second circuit is configured to unbypass the diode by inactivating the second circulation transistor.

25. A power supply, comprising:
a first voltage input node;
a reference node;
an output node configured to provide a regulated output signal;
a first phase having a first drive switch coupled between the input and output nodes;
a second phase magnetically coupled to the first phase and having a second circulation element coupled between the reference and output nodes; and
a power-supply controller, comprising:
   a first circuit configured to open and close the first drive switch,
   a second circuit configured to bypass and unbypass the second circulation element, and
   a third circuit configured to cause the second circuit to bypass the second circulation element for at least a portion of a time during which the first drive switch is closed
wherein the second circulation element comprises a second circulation transistor, a switch coupled across the second circulation transistor, and a diode;
wherein the second circuit is configured to bypass the diode by closing the switch; and
wherein the second circuit is configured to unbypass the diode by opening the switch and inactivating the second circulation transistor.

26. A system, comprising:
a load; and
a power supply, comprising:
   an input node;
   a reference node;
   an output node configured to provide a regulated output signal to the load;
   a first phase having a first drive switch coupled between the input and output nodes;
   a second phase magnetically coupled to the first phase and having a second circulation element coupled between the reference and output nodes; and
   a power-supply controller, comprising:
      a first circuit configured to open and close the first drive switch,
      a second circuit configured to direct a magnetically induced current flowing through the second phase around the second circulation element and through the second circulation element, and
      a third circuit configured to cause the second circuit to direct the magnetically induced current around the second circulation element for only a fraction of a time period during which the first drive switch is closed.

27. The system of claim 26 wherein the load comprises an integrated circuit.

28. The system of claim 26 wherein at least a portion of the load and at least a portion of the power supply are disposed on a same integrated-circuit die.

29. The system of claim 26 wherein at least a portion of the load and at least a portion of the power supply are disposed on respective integrate-circuit dies.

* * * * *

UNITED STATES PATENT AND TRADEMARK OFFICE
CERTIFICATE OF CORRECTION

PATENT NO. : 9,755,520 B2
APPLICATION NO. : 12/651985
DATED : September 5, 2017
INVENTOR(S) : Wei et al.

It is certified that error appears in the above-identified patent and that said Letters Patent is hereby corrected as shown below:

In the Specification

In Column 1, Line 9, delete "2008;" and insert -- 2008, now pat. No 7786711; --, therefor.

In Column 1, Line 51, delete "current" and insert -- conduction --, therefor.

In Column 3, Line 35, delete "$i_{S22}$" and insert -- $i_{S12-1}$ --, therefor.

In Column 4, Line 53, delete "(continuous" and insert -- (continuous conduction --, therefor.

In Column 4, Line 56, delete "FIG. 7." and insert -- FIG. 7; --, therefor.

In Column 4, Line 58, delete "regulator." and insert -- regulator; --, therefor.

In Column 6, Line 65, delete "MOSFETS" and insert -- MOSFETs --, therefor.

In Column 7, Line 48, delete "MOSFETS" and insert -- MOSFETs --, therefor.

In Column 9, Line 5, delete "MOSFETS" and insert -- MOSFETs --, therefor.

In Column 10, Line 65, delete "MOSFETS (or shunt MOSFETS)" and insert -- MOSFETs (or shunt MOSFETs) --, therefor.

In the Claims

In Column 13, Line 49, in Claim 24, delete "closed" and insert -- closed; --, therefor.

In Column 14, Line 17, in Claim 25, delete "closed" and insert -- closed; --, therefor.

Signed and Sealed this
Twenty-ninth Day of May, 2018

Andrei Iancu
*Director of the United States Patent and Trademark Office*